United States Patent [19]

Cawte

[11] Patent Number: 5,605,028
[45] Date of Patent: Feb. 25, 1997

[54] SEALING JOINTS BETWEEN CEMENTITIOUS ARTICLES

[75] Inventor: Christopher J. Cawte, Belton, United Kingdom

[73] Assignee: Caswick Limited, Belton, United Kingdom

[21] Appl. No.: 334,566

[22] Filed: Nov. 3, 1994

[30]    Foreign Application Priority Data

Nov. 5, 1993 [GB] United Kingdom .............. 9322796

[51] Int. Cl.$^6$ ................................................ F16L 49/00
[52] U.S. Cl. .............................. 52/393; 52/62; 52/218; 52/219; 285/230; 285/379
[58] Field of Search ........................... 52/62, 218, 219, 52/393; 285/230, 379

[56]    References Cited

U.S. PATENT DOCUMENTS

| | | | |
|---|---|---|---|
| 3,125,192 | 3/1964 | Ramseur, Jr. ........................ | 52/393 X |
| 3,346,248 | 10/1967 | Martinet et al. ..................... | 52/393 X |
| 3,729,939 | 5/1973 | Shimizu ............................. | 285/230 X |
| 4,116,474 | 9/1978 | Wolf .................................. | 285/230 X |
| 4,703,940 | 11/1987 | Dana .................................. | 285/230 |

FOREIGN PATENT DOCUMENTS

| | | | |
|---|---|---|---|
| 0057802 | 1/1975 | Australia .............................. | 285/230 |
| 0459797 | 1/1991 | European Pat. Off. ............... | 285/230 |
| 1806616 | 5/1970 | Germany ............................. | 285/230 |
| 1014364 | 12/1965 | United Kingdom . | |
| 2064023 | 6/1981 | United Kingdom . | |
| 2144190 | 2/1985 | United Kingdom . | |

OTHER PUBLICATIONS

Search Report for Corresponding UK Application 9322796.5.

Primary Examiner—Wynn E. Wood
Attorney, Agent, or Firm—Christie, Parker & Hale, LLP

[57] ABSTRACT

Joints between vertical shafts such as concrete manhole elements are sealed by an elastomeric ring and a rigid locating ring. The locating ring keys into the elastomeric ring and holds it in place during and (optionally) after assembly. The principle is applied to various types of joint and the locating ring may be extended to form a liner for the shaft.

15 Claims, 2 Drawing Sheets

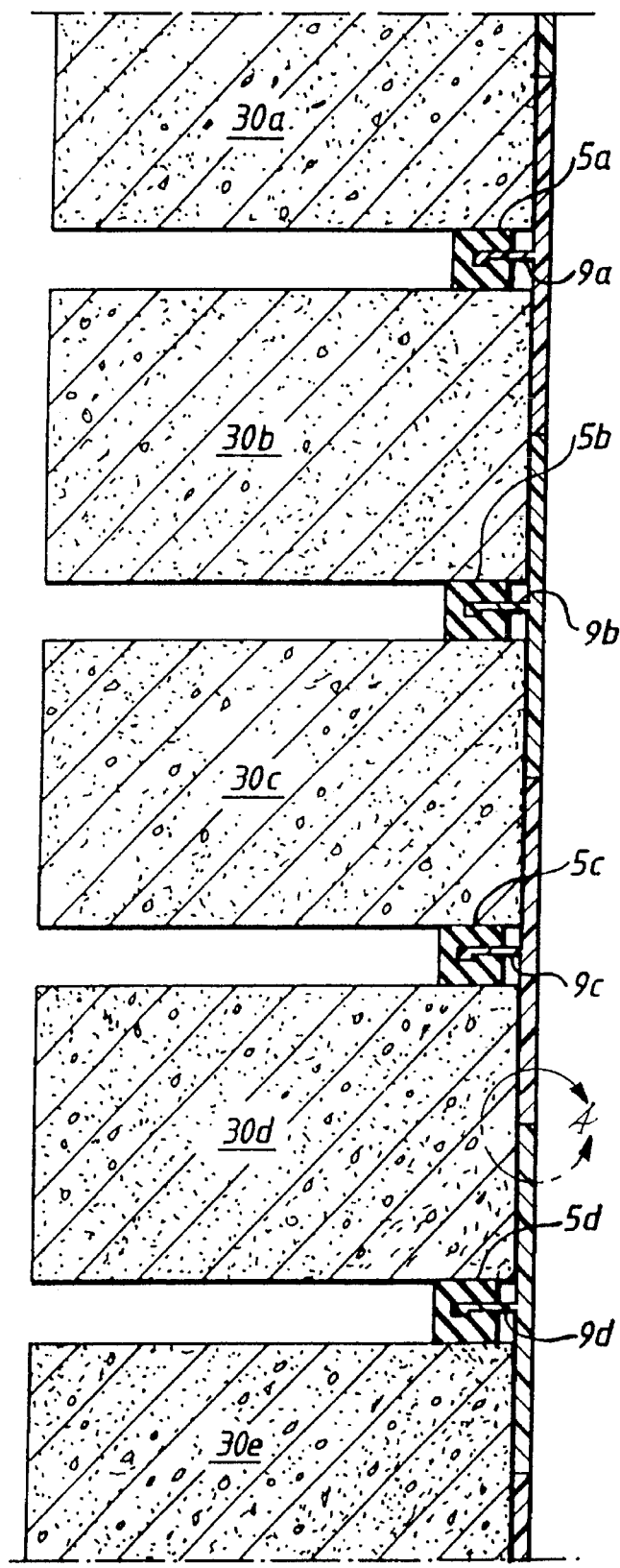
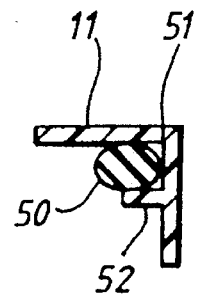
Fig.5.
Fig.4.
Fig.3.

SEALING JOINTS BETWEEN CEMENTITIOUS ARTICLES

BACKGROUND TO THE INVENTION

This invention relates to a method and apparatus for sealing joints between concrete or other cementitious articles. In particular but not exclusively, it relates to sealing joints between precast concrete components such as concrete shafts forming pipe structures or manhole or other vertical shafts.

DESCRIPTION OF THE PRIOR ART

The majority of man access to sewers and non-pressure pipelines is by precast concrete shafts. These are normally rectangular or circular in section and have a depth of normally between about 1 and about 6 meters. It has recently become desirable that joints between these prevent ingress or egress of fluids from and to the pipeline and are flexible to be effective when the components are displaced by ground movement and/or other external loads. This has been a requirement in pipes for a long time.

There are two main types of joint common to shafts such as manholes. First, a tongue and groove joint in which an annular tongue on one shaft locates in a cooperating annular groove in a second shaft. Generally, an unset cement grout is placed in the groove prior to the joint being assembled. This serves to fill the gap when set and to create a seal but does not give a flexible, reliable water-resistant joint.

A second type of connection is by means of a socket and spigot. This may be known as an ogee joint. In this type of joint, one of the members (normally the topmost one) is formed with an annular socket and the other member is formed with a spigot at its end which locates into the socket. This type of joint may also be used with a grout but is more commonly used with an extruded sealant material or with elastomeric rubber or plastic sealing rings. If a sealant material is used then it is easy to accommodate variations in the joints due to manufacturing tolerances. However, the sealant must be fitted on site and requires careful supervision. Problems are often associated with stretching the material, placing it in the wrong position or the incorrect size being used. If the joint is for any reason made incorrectly then it is very difficult to open and remake the joint due to the adhesive nature of sealant materials. It is also important that the concrete surfaces are not wet or dusty otherwise the sealant will not adhere properly. Also, a typical extruded sealant has only limited pressure resistance and will eventually begin to extrude from the joint under high pressure and thus reduce the effectiveness of the seal.

A conventional elastomeric seal has a defined physical form and property and is thus easier to apply than a sealant. It may be used on wet or dusty joints since it is not required to physically adhere to the concrete and also the joint may relatively easily be split and remade if incorrect. However, in order for an elastomeric ring-like seal to be effective, the concrete articles it is joining must be accurately made, in particular in terms of angular gap and (lack of) ovality. Also, for each particular type of joint, a new pallet ring or base is generally required. Thus, in any installation of significant size, a large number of different concrete pallet rings or bases may be required to be held in store and this can create major problems in storage and in capital investment. Particularly in the spigot and socket type of joint, since the parts are assembled together after the ring has been placed, some relative sliding movement inevitably occurs between the elastomeric ring and, typically, the spigot of the joint. The ring must therefore be lubricated so that it is not physically shifted by the sliding movement and thus moved out of position. This lubrication is again generally done on site and is very awkward and time consuming. Furthermore, the physical placing of the ring can be dangerous if done on site while the next component is waiting to be put on.

An object of the present invention is to provide an improved and quicker sealing method.

BRIEF DESCRIPTION OF THE INVENTION

According to the present invention there is provided a joint between two cementitious tubular articles, comprising an elastomeric sealing ring and an at least partially rigid ring serving to positively locate the sealing ring.

The joint is preferably a vertical joint such as in a manhole, for example between manhole rings or between a manhole base and shaft.

The locating ring may be in two or more pieces, one of the pieces being removable after the sealing ring has been located and the joint made.

The locating ring may be continuous or may be discontinuous, e.g. split to facilitate removal where necessary.

Seals may be provided on the inside and/or on the outside of a joint between tubular articles.

In one embodiment, each ring may comprise an outwardly directed portion to locate the sealing ring and a skirt portion. Where a plurality of such joints are formed, for example in a manhole system where a number of manhole rings are joined together, at least some of the skirt portions may be lengthened so that they abut to form a liner for the manhole.

The elastomeric sealing ring is preferably of a rubber or plastic elastomeric material and the locating ring is preferably of a rigid plastic material.

According to the present invention there is further provided an access shaft comprising at least two vertically spaced cementitious articles and a joint between them, wherein the joint comprises an elastomeric sealing ring, and a location ring of greater rigidity than the sealing ring serving to positively locate the sealing ring at a predetermined position with respect to the articles.

According to the present invention there is further provided apparatus for forming a sealed joint between tubular cementitious articles, comprising a substantially rigid ring having a skirt portion for abutting against the bore or external surface of an article, and a portion for extending outwardly or inwardly of the skirt and adapted to secure an elastomeric seal at a specified position with respect to the cementitious articles.

The term access shaft includes, inter alia, manholes, inspection chambers, or other, generally vertical shafts which may or may not be of sufficient size for man access. The cementitious articles may be tubular, of any cross section, e.g. circular, oval, rectangular, etc.

BRIEF DESCRIPTION OF THE DRAWINGS

Embodiments of the invention will now be described, by way of example only, with reference to the accompanying drawings, in which:

FIG. 3 shows a series of joints in a shaft or manhole;

FIG. 4 shows an enlarged detail of part of FIG. 3; and

FIG. 5 shows an alternative configuration in which the elastomeric ring is an O-ring.

DETAILED DESCRIPTION OF EMBODIMENTS OF THE INVENTION

Each of the figures shows a cross section through part of a joint between generally tubular concrete articles such as shafts or manhole rings for example. The examples shown are all of vertical or generally vertical structures but the invention may also be applied to structures lying in other dispositions.

The bore of each of the joints is to the right of the figures.

Figure 1:
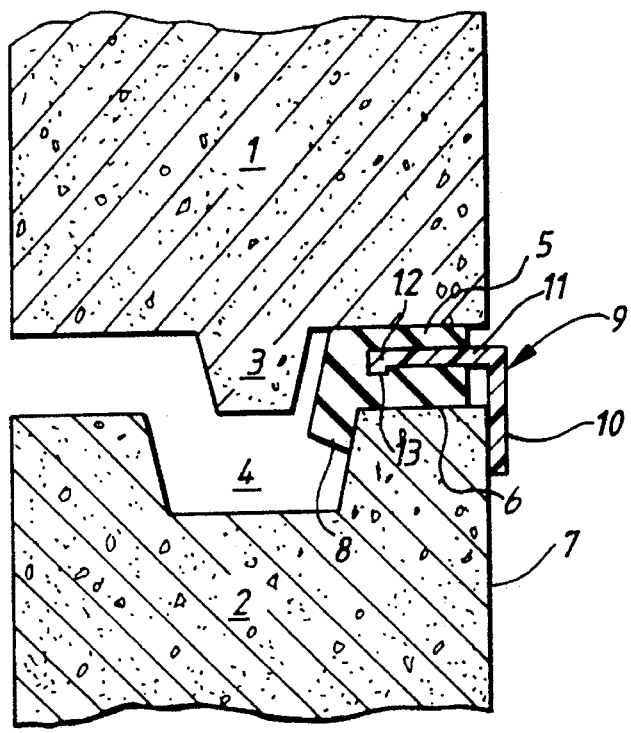
FIG. 1 shows a tongue and groove type joint including a positively located seal.

Referring to FIG. 1, a tongue and groove type joint between two concrete shaft members 1 and 2 includes an annular downwardly directed tongue 3 forming part of shaft member 1 and a cooperating annular groove 4 formed on shaft member 2. An elastomeric ring 5 is sized to fit upon an internal shoulder 6 of shaft 2, which shoulder 6 is formed between groove 4 and its internal edge 7. Optionally, the peripherall outer edge 8 of elastomeric sealing ring 5 may be formed as a flange portion as shown to extend partially into groove 4. This may aid location of the ring but is not essential. A plastic location ring 9 is of a material which is more rigid than elastomeric seal 5. Ring 9 includes an internal annular flange portion 10 adapted to rest against internal edge 7 of shaft 2 and a projection from one end of annular flange 10 and, in this embodiment, at approximately 90° thereto. Thus the ring is of generally L-shape in cross section. Projection 11 is arranged to extend a distance outwardly and is arranged to locate into sealing ring 5 by means of an enlarged peripheral end portion 12 which keys into a cooperating annular groove 13 in the seal, thus locating and securing the seal. The top part of the sealing ring may comprise a flap portion such that, in use, the flap portion is held open, the locating ring is placed so that portion 12 keys into groove 13 and the flap may then be replaced over the top of location ring. Other ways of securing the location ring may be appropriate, such as by providing a groove radially groove in an elastomeric member for depth sufficient to receive the portions 11 and 12 of locating ring 9, the natural resilience of the material allowing insertion and subsequent locking into place of the rigid element.

In use, after shaft 2 has been positioned, the locating ring 9 is placed into position and then the elastomeric seal is positioned. Upper shaft 1 may then be placed into position and lowered. Alternatively, the sealing ring may first be connected to the locating ring and then the thus-formed assembly placed into position on the concrete ring. Sealing ring 5 then tightly seals the gap between the two shafts and does not allow ingress or egress of water into or out of the pipe. Since ring 5 is securely located any substantial rolling movement of it a downward movement of the tongue against it is prevented.

Figure 2:
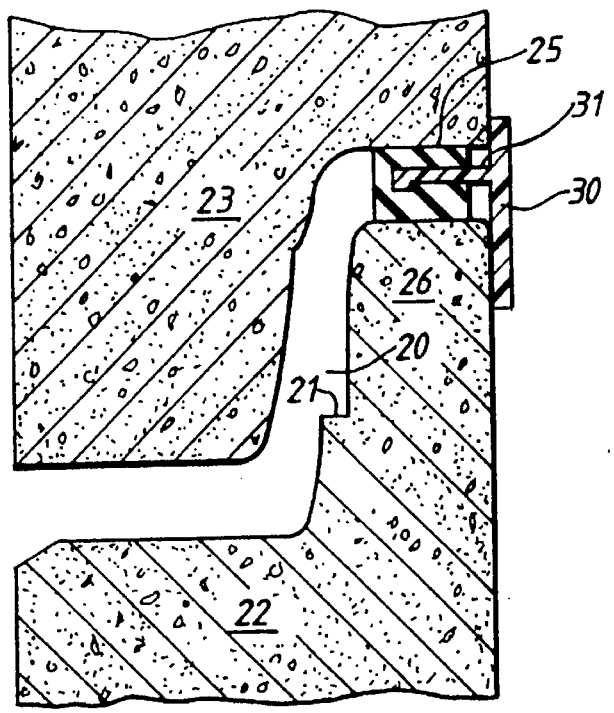
FIG. 2 shows a socket and spigot type joint including a positively located seal.

FIG. 2 shows a similar sealing arrangement for a spigot and socket (ogee) type of joint. This type of joint is conventionally sealed by mounting an elastomeric sealing ring in a space 20 defined by a shoulder 21 in the spigot bearing shaft (bottom shaft 22). In such a conventional arrangement, as the socket bearing shaft 23 is forced downward a seal is created by the elastomeric seal being compressed between the socket and spigot. The disadvantages of this type of arrangement are described above.

In this embodiment of the invention, an elastomeric sealing ring 25 is placed above the annular plateau portion of spigot 26. The locating ring may be as shown in FIG. 1 or may be of other configurations, one example of which is shown in FIG. 2. In this example, the locating ring is of generally T-shaped cross section rather than the generally L-shaped cross section of the embodiment of FIG. 1. Thus, the internal flange portion 30 extends both below and above the horizontally projecting portion 31. This has the advantage that if abutted against the sides of respective shafts 22 and 23 the rigid locating ring provides an initial seal or secondary containment means against fluid ingress or egress.

In some embodiments, the locating ring may be on two or more portions. One or more of these may be detachable. For example, portion 30 may be detachable from portion 31 so that after a seal 25 has been placed into position and the spigot and socket joint (or tongue and groove joint) has been made, portion 30 may be detached from location ring 31 and reused by being attached to a new horizontally projecting portion. This can provide economies to the user. The configuration of the location ring shown in FIG. 2 may of course be used in the type of joint shown in FIG. 1.

FIG. 3 shows schematically a stack of shafts 30a to 30e. The particular type of joint between them has not been shown in the figure. It may be any of the types described above or other types of joints. The joints between each of these shafts are sealed by an elastomeric sealing ring 5a to 5d and a rigid insert 9a to 9d according to the invention. The internal skirt portion of each of rigid inserts 9a to 9d is lengthened as shown so that in use they meet or nearly meet each other edge to edge, forming a continuous, or substantially continuous skirt through the internal surface of the stack. Thus, the rigid locating rings may also perform a secondary function of providing lining or secondary containment for a pipe, shaft, manhole or other concrete articles. It is becoming more desirable to line such structures and the present invention therefore provides a method of achieving both lining and joint sealing by the same structure.

As is shown by FIG. 4, where the internal skirts of rigid locating rings 9 meet, their abutting edges may be required to be keyed or complementarily shaped to provide better sealing against fluid ingress or egress. This may be by cooperating annular flanges and grooves as shown schematically in FIG. 4 or by other means.

The elastomeric sealing ring of the present invention may be of a material such as rubber, a thermoplastic elastomer or another suitable material.

The rigid or partially rigid ring 9 may be located at any relative portion with respect to ring 5 and need not necessarily be toward the top as shown in FIGS. 1 and 2.

The location ring may be of a material such as a thermoplastic material, glass reinforced plastic material (GRP) or even of suitable metals or other materials for example. In use, a combination of an elastomeric ring and the rigid location ring may be supplied already assembled for fitting or the installer may fit each component separately.

The locating ring may be fitted as a concrete component is removed from a mould or forming machine and before the concrete has set, to improve accuracy of the component in terms of, e.g., ovality. The ring may also be placed in a mould or machine before the concrete and be cast in place.

FIG. 5 shows an alternative configuration in which the elastomeric ring is an O-ring 50. This can fit into the corner 51 of a location ring 9 of L-shape, T-shape or other cross section. In this embodiment it may be found necessary to include an additional ledge portion or retaining shoulder 52 for retaining the O-ring during installation. In a construction such as shown in FIG. 5, it will be necessary for the horizontally outstanding portion 11 of the locating ring to abut against the bottom face of the upper shaft member to provide the seal. Alternatively, if the location ring is of T-shaped cross section then two O-rings may be provided above and below the portion 11.

The present invention is not restricted to use on tongue and groove, and socket and spigot type joints, but may be used on many different types of joints. It may also be applied to other types of cementitious articles other than concrete ones.

The location ring, whether in conjunction with a sealing element or not, can be used as a spacer to prevent damage to concrete components during handling or delivery. A common existing problem is spalling of concrete due to point loading. A location ring can give a continuous gap between stacked articles and can evenly spread loads during vertical stacking.

When in use a location ring serves to partially or fully conceal the joint gap and prevent solids being trapped during surcharges within the system.

The seal and/or ring are preferably formed by extrusion.

Although the location ring and seal as described above are separate elements, it is possible to co-extrude them from two different materials, to form a complete ring/seal assembly in one extrusion operation.

The location ring may be formed as an extrusion and then its ends connected, for example by welding or by using a separate connector. If the ends are, e.g., welded together then a continuous ring is formed. If a separate connector is used it may be one which is detachable or which can be detached from one side of the joint between the two ends, to enable the ring itself to be detachable from a concrete joint.

I claim:

1. An access shaft comprising an upper and a lower, vertically spaced, cementitious tubular article and a joint between them, said lower tubular article having an annular shoulder portion adjacent an edge thereof, and said upper article bearing vertically on said shoulder;

wherein the joint comprises an elastomeric sealing ring positioned between said shoulder and said upper tubular article and vertically compressed by the weight of the upper tubular article to provide a seal, and a location ring of greater rigidity than the sealing ring and comprising an annular flange which rests against said edge and a portion extending to engage said sealing ring before vertical compression thereof.

2. An access shaft as claimed in claim 1 wherein the location ring comprises a substantially L-shaped cross section.

3. An access shaft as claimed in claim 1 wherein the location ring comprises a substantially T-shaped cross section.

4. An access shaft as claimed in claim 1 wherein the location ring includes a protrusion and the sealing ring comprises a recess cooperating with said protrusion for engaging said location ring with said sealing ring.

5. An access shaft as claimed in claim 1 wherein the location ring has a detachable part which is detached after the joint is made.

6. An access shaft as claimed in claim 1 wherein one said elastomeric ring and one said location ring are both provided at both a peripheral inner edge and a peripheral outer edge of said joint.

7. An access shaft as claimed in claim 1 further comprising a third tubular article, and a second joint comprising a second elastomeric member and a second location ring between said upper and said third article, said second location ring having an annular flange extending to engage said annular flange of said location ring to form a substantially continuous liner.

8. An access shaft as claimed in claim 1 wherein the sealing ring and the location ring are formed as a co-extrusion.

9. An access shaft as claimed in claim 1 wherein the location ring comprises a single elongated strip connected together at ends thereof to form said ring.

10. An access shaft as claimed in claim 9 wherein the ends of the location ring are welded together.

11. An access shaft as claimed in claim 9 wherein the ends of the location ring are detachably connected.

12. An access shaft as claimed in claim 1 wherein said tubular articles are joined by a tongue and groove joint.

13. An access shaft as claimed in claim 1 wherein said tubular articles are joined by a socket and spigot joint.

14. An access shaft as claimed in claim 1 wherein the annular shoulder portion of said lower tubular article is adjacent an internal edge thereof.

15. An access shaft as claimed in claim 1 wherein the annular shoulder portion of said lower tubular article is adjacent an external edge thereof.

\* \* \* \* \*

UNITED STATES PATENT AND TRADEMARK OFFICE
CERTIFICATE OF CORRECTION

PATENT NO.    : 5,605,028
DATED         : February 25, 1997
INVENTOR(S)   : Christopher J. Cawte It is certified that error appears in the above-indentified patent and that said Letters Patent is hereby corrected as shown below:

Abstract, line 5, change "joint" to -- joints --.
Column 1, line 23, change "joint" to -- joints --.
Column 1, line 63, replace "store" with -- storage --.
Column 3, line 32, after "ring is" delete "of".
Column 3, line 32, change "L-shape" to -- L-shaped --.
Column 3, line 43, after "radially" delete "groove".
Column 3, line 56, after "of it" insert -- caused by --.

Signed and Sealed this

Twelfth Day of May, 1998

Attest:

BRUCE LEHMAN

Attesting Officer    Commissioner of Patents and Trademarks